INVENTOR
ERICH J. KOCHER
BY Lieber & Niller
ATTORNEY

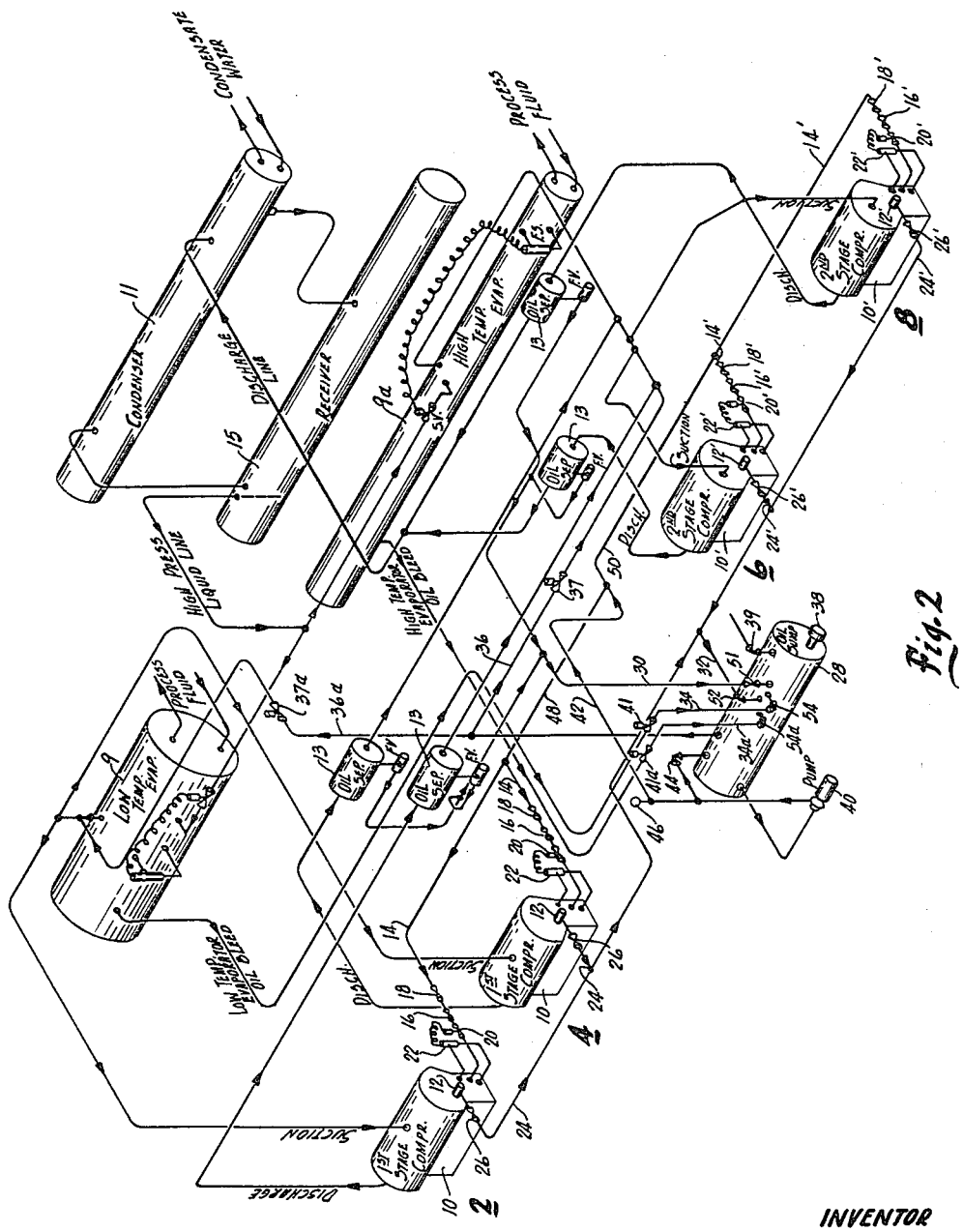

United States Patent Office

3,500,962
Patented Mar. 17, 1970

3,500,962
LUBRICATION SYSTEM FOR COMPRESSORS
Erich J. Kocher, Milwaukee, Wis., assignor to Vilter Manufacturing Corporation, Milwaukee, Wis., a corporation of Wisconsin
Continuation-in-part of application Ser. No. 599,498, Dec. 6, 1966. This application May 1, 1969, Ser. No. 820,831
Int. Cl. F25b 43/02
U.S. Cl. 184—103                                       8 Claims

ABSTRACT OF THE DISCLOSURE

Lubrication systems for compressors, and particularly a lubrication system for maintaining a desired amount of lubricant in each of a plurality of reciprocating compressors by supplying such lubricant under pressure from a common sump. The lubricant is provided to each of the compressors independently, and in amounts dependent on the amount of lubricant existing in each of the compressors.

CROSS-REFERENCES

Figure 1:
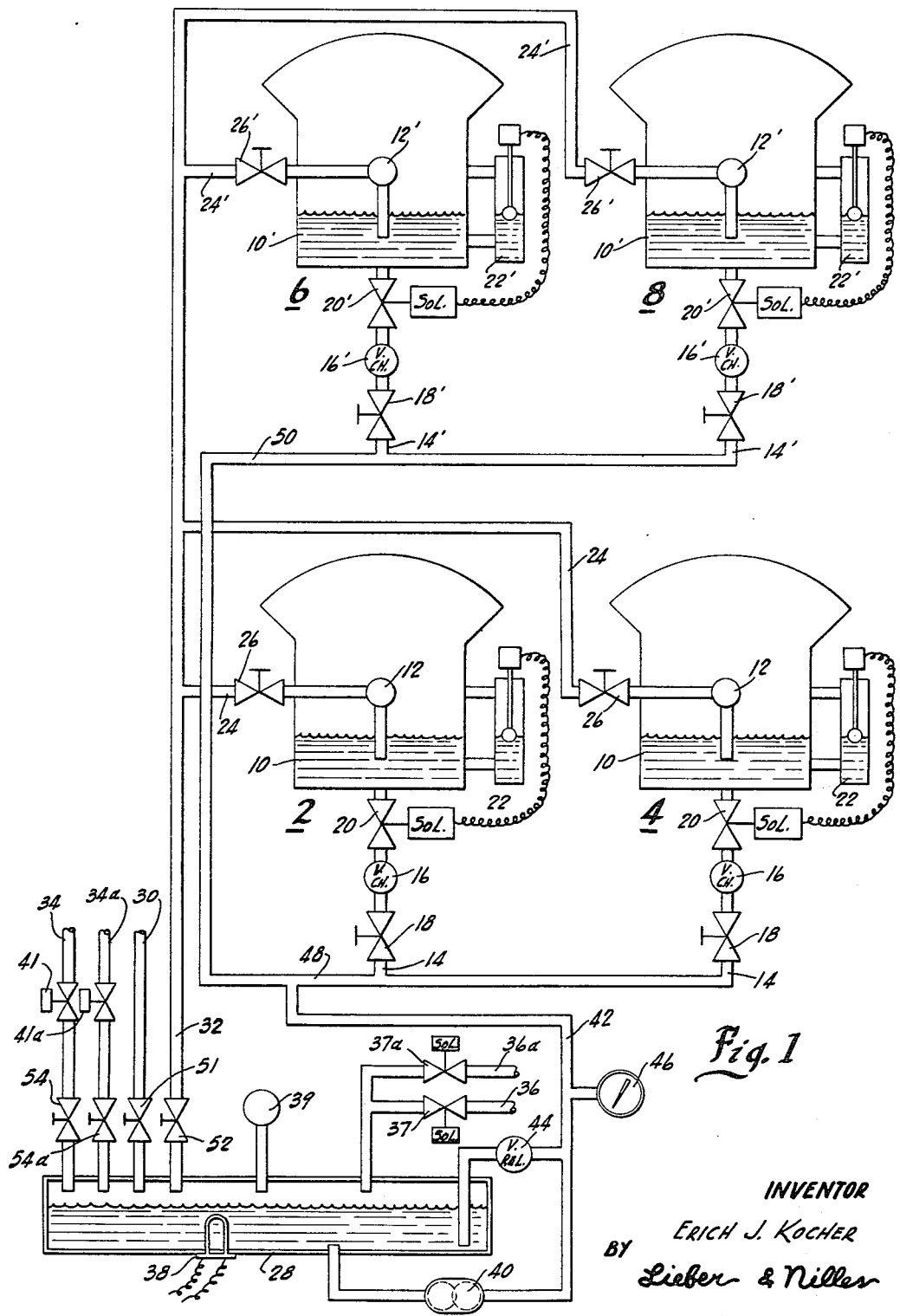

This application is a continuation-in-part of U.S. Patent application Ser. No. 599,498, filed Dec. 6, 1966 in the name of Erich J. Kocher, and now abandoned.

PRIOR ART

Reciprocating compressors find widespread application in the compression of gases such as air or refrigerant. The compression requirements in such cases often necessitates the use of two or more reciprocating compressors connected in series in the gas stream so as to form a multi-stage compressor system. The capacity requirements in some cases may, in addition, compel the use of two or more compressors, either single or multi-stage, connected in parallel across the gas stream.

The reciprocating compressors thus utilized include a lubricant filled crankcase which provides lubricant to the moving parts of the compressor. The oil or other lubricant in this crankcase must be maintained between a minimum amount necessary for proper lubrication and a maximum amount beyond which the lubricant interferes with the operation of the machine and the effectiveness of the system.

All reciprocating compressors consume oil during their operation. In the main, this oil is lost by passage between the piston rings and the cylinder walls into the gas stream undergoing compression. The oil becomes entrained in the gas stream and passes from the compressor through the high pressure discharge port. The rate at which a given compressor will lose oil is dependent on the condition of the piston rings and cylinder walls and on the operating condition or operational state of that particular compressor and the requirements of the gas system, and the lubricant requirements will, of course, vary depending upon these factors. Accordingly, in apparatus employing a plurality of compressors, it is normal that each of the compressors consume oil at differing rates. Additionally, in multi-stage compressors the oil entrained during compression in the previous stages often serves to limit the requirements and loss of oil from the compressor crankcases in the subsequent stages, and in some instances, the oil entrained in the gas stream may accumulate in the compressors of the subsequent stages.

The oil entrained in the gas stream is customarily separated from the gas by oil separation means located in the gas system. In a refrigeration system, for instance, the oil separation means may be located in advance of or in association with the inlet end of the condenser. As would be expected, it is general practice in the art to return the separated oil to the compressors to replace the oil lost during operation, thereby providing lubrication economies.

Due to the varying oil consumption requirements of the various compressors, it is difficult, if not impossible, to so apportion the supply of lubricating oil between the compressors as to constantly maintain the proper amount of lubricant in each individual compressor. Efforts have been made to simplify the apportionment of the lubricant by providing a common lubricant sump in which all the separated return oil is stored and from which lubricant may be supplied to each compressor in the required amount. In the past, however, complicated piping and pressure control apparatus has been required in an effort to insure that the oil will flow from the various oil separation points to the common sump. As the oil was heretofore generally fed from the sump to the compressor crankcases by gravity, additional apparatus was required to equalize the pressure in the several compressor crankcases so that the required oil would flow from the sump to each of the crankcases. All such apparatus undesirably added to the complexity and unreliability of the lubrication system.

SUMMARY

It is therefore, an object of the present invention to provide a lubrication system for maintaining a desired amount of lubricant in each of a plurality of compressors by independently providing lubricant to the compressors in amounts dependent on the amount of lubricant existing in each of the compressor crankcases.

It is another object of the present invention to provide a lubrication system for maintaining a desired amount of lubricant in each of a plurality of compressors from a common lubricant sump by supplying lubricant under pressure to the compressors from the sump in amounts dependent on the amount of lubricant existing in each of the individual compressors.

Still another object of the present invention is to provide a lubrication system for maintaining a desired amount of lubricant in each of a plurality of compressors supplied thereto from a common lubricant sump, the improved system including means interposed between the compressors and the common lubricant sump for pressurizing the supply lines from the sump to the compressors and means for controlling the supply of lubricant to each compressor independently of the others.

A further object of the present invention is to provide an improved compressor lubrication system adapted to maintain controlled amounts of lubricant in each of a plurality of compressors supplied with the lubricant from a common sump, the system including a pump interposed between the compressors and the common lubricant sump for pressurizing the supply lines from the sump to the compressors and also including means in the supply lines responsive to the amount of lubricant in the individual compressors for controlling lubricant feed from the sump independently to each of the compressors in amounts dependent upon the amount of lubricant existing in each compressor crankcase.

DRAWING

Other objects and advantages of the present invention will become apparent as the following specification proceeds, reference being had to the drawing forming a part thereof, in which:

FIGURE 1 is a schematic diagram of a typical compressor system containing a plurality of compressors connected in stages and including the lubrication system of the present invention; and FIGURE 2 is a diagrammatic view of a typical refrigeration system embodying the compressors and the improved lubrication system.

DETAILED DESCRIPTION

Referring to the drawings, there is shown therein, an exemplary four compressor system containing compressors 2, 4, 6 and 8. Compressors 2 and 4 are first-stage compressors which receive gaseous refrigerant to be compressed. For example, compressors 2 and 4 may receive the gaseous refrigerant at their inlet or suction ports from the low temperature evaporator 9 of a refrigeration system. Under certain load conditions, the compressed gas discharge, from the first stage compressors 2 and 4 is supplied to the inlet or suction ports of the second stage compressors 6 and 8 where it undergoes additional compression and is then supplied to the refrigeration system condenser 11 and then to the receiver 15 and evaporators 9, 9a. Depending upon the application to which the compressor system is put, more than one evaporator, as for example, a high temperature evaporator 9a and a low temperature evaporator 9, may be utilized in the refrigeration system. The refrigeration system also normally includes one or more oil separators 13 to remove entrained oil from the refrigerant.

Each of the compressors 2 and 4 includes a crankcase 10 for the retention of the desired amount of lubricant necessary to lubricate the moving parts of the compressor. Such lubrication may be supplied to parts of the compressor by splashing or dipping the crankshaft and other moving parts in the lubricant and may be supplied to the shaft and bearings by means of oil pumps 12 which provide pressure lubrication to the parts. The second stage compressors 6 and 8 each likewise include a crankcase 10' and an oil pump 12', and these compressors are lubricated in like manner.

Crankcases 10, 10' are supplied with lubricant from inlet lines 14, 14' containing check valves 16, 16' metering valves 18, 18' and solenoid valves 20, 20'. Solenoid valves 20, 20' are operated by float switches 22, 22' or the like which are responsive to and operated by the amount of lubricant in crankcases 10, 10'. Lubricant pressurized by the pumps 12, 12' is removed through outlet lines 24, 24' containing metering valves 26, 26'.

A common lubricant sump 28 is provided for the entire compressor system including all of the compressors 2, 4, 6 and 8. Sump 28 may consist of an enclosed tank or other container which receives lubricant from various sources including the oil separators in the refrigeration system via return line 30, from the crankcases 10, 10' via outlet lines 24 and 24' and common return line 32, and from the evaporators via bleed lines 34, 34a.

The refrigerant and oil mixture returned to the sump 28 is subjected to heat as by means of a heater 38 extending within the sump in order to separate the refrigerant from the oil, and to prevent excessive pressure or suction from building up in the sump as by reason of the heat generated therein and which might otherwise hinder gravity return of lubricant to the sump, equalizing lines 36 from the low pressure inlets of the second stage compressors and 36a from the first stage compressors may be connected to sump 28. Thus, whenever the first stage compressors are operating, equalizing line 36a is opened by the solenoid control valve 37a and equalizing line 36 is closed by the solenoid valve 37, and when only the second stage compressors are operating, equalizing line 36 is opened by the valve 37 and equalizing line 36a is closed by the valve 37a. Since similar conditions exist in the bleed lines from the evaporators, a solenoid controlled valve 41 should also be interposed in the bleed line 34 from the low temperature evaporator 9, such valve being operable to close this line when the first stage compressors are inoperable, and a solenoid controlled valve 41a should likewise be interposed in the bleed line from the high temperature evaporator to close this line when the second stage compressors are inoperable. The heater 38 should, of course, be maintained at a predetermined temperature, and the sump 28 may also contain a safety valve 39.

A pressurizing means such as lubricant circulating pump 40 removes lubricant from sump 28 and supplies it under pressure to supply line 42. Pump 40 may be of the meshed gear type or of any other type suitable for use with lubricants. In the alternative, transfer drums or the like may be used to pressurize supply line 42. Supply line 42 includes a relief valve 44 which returns lubricant to sump 28 in the event of excessive pressures in supply line 42, and may also include a pressure gauge 46 or other warning device. Supply line 42 is connected to inlet lines 14, 14' and to the crankcases of the compressors 2 through 8 by lines 48 and 50.

In operation, the common sump 28 is filled with lubricant, and pump 40 is started, filling supply line 42 with lubricant and pressurizing the line. Depending on the level of lubricant in each of the crankcases 10, 10', float switches 22, 22' on one or more of the compressors open solenoid valves 20, 20' to allow lubricant to flow through the solenoid valves 20, 20', metering valves 18, 18' and check valves 16, 16' into crankcases 10, 10'. When the desired amounts of lubricant are present in each of the crankcases 10, 10', the respective float switches 22, 22' close solenoid valves 20, 20'. The compressors are, of course, powered in the usual manner by suitable motors (not shown).

Compressors 2 through 8 commence to compress the gases passing through them and are lubricated while doing so by the lubricant in crankcases 10, 10'. As previously noted, such lubrication may be provided by dipping or splashing the affected parts in the lubricant and by pressure lubrication provided by pumps 12, 12'.

During their compressing operation, compressors 2 through 8 and particularly first stage compressors 2 and 4, consume the lubricant in their respective crankcases at varying rates due to the factors referred to above. When the amount of lubricant in any of the crankcases 10, 10' reaches a predetermined minimum amount, the respective float switch 22, 22' opens the associated solenoid valve 20, 20' to supply an additional amount of lubricant to that crankcase under the influence of the pressure in supply lines 42, 48, and 50 as generated by pump 40. In this manner the desired minimum amount of lubricant is maintained in each compressor crankcase 10, 10' independently of the conditions existing in the other compressors as determined solely by the lubricant consumption rate of that particular compressor.

To prevent an excessive amount of lubricant accumulation in any one of the crankcases 10, 10' such as might most likely occur in second stage compressors 6 and 8, lubricant is removed from the crankcase by continuous bleed means through outlet lines 24, 24' and return line 32 which returns it to the common lubricant sump 28. Additional amounts of lubricant are returned to the common sump 28 in return line 30 from the oil separators in the refrigeration system. The return of lubricant to the common lubricant sump 28 is aided by the pressure equalization lines 36, 36a as aforesaid. The accumulated lubricant in the common lubricant sump 28 is supplied to pump 40 for pressurized recirculation through supply lines 42, 48 and 50 to compressor crankcases 10, 10', and the heater 38 operates to drive off residue refrigerant from the oil.

By the foregoing means, the lubricant from the common lubricant sump is independently supplied under pressure to each of a plurality of compressors in a multi-compressor system in controlled amounts dependent on the lubricant consumption rate and the demand of each individual compressor, thereby maintaining the desired requisite amount of lubricant in each of the compressor crankcases and insuring that each compressor receives adequate lubrication.

While the means for pressurizing the supply lines 42, 48, 50 has been shown and described herein as consisting of the pump 40, these supply lines may be pressurized in any suitable manner. Similarly, although the means for controlling the flow of oil through the supply lines to each of the compressors independently of the others has been shown and described herein as comprising a float actuated switch and solenoid controlled valve, such control means may consist merely of a float controlled valve for each of the compressors. In any event, the lubrication system finds particular application in a multi-compressor lubrication system wherein the compressors are lubricated by oil supplied to the crankcases of the compressors with the oil being reclaimed for re-use in the system.

Also, while stop valves 51, 52, 54, and 54a in the lines 30, 32, 34, and 34a respectively have been shown and described as being utilized in the system, a more positive automatically operable means of controlling the quantity of refrigerant-oil mixture that is returned of the oil receiver 28 from the various points in the system may be provided. For example, the solenoid valves 41 and 41a located in the refrigerant-oil bleeder lines 34, 34a respectively between the evaporators and the oil receiver may be suitably connected to the thermostat of heater 38 so that the valves will open and permit return of the refrigerant-oil mixture only when the heater has shut off and the oil is warm in the receiver or sump 28. This arrangement maintains the flow of refrigerant-oil mixture back to the receiver 28 in the correct quantity so that the heater capacity for boiling off refrigerant will not be exceeded, and the arrangement also eliminates the need for very fine adjustment of the manual valves 54, 54a which can easily become plugged with oil or foreign particles when these valves are in an almost closed position.

I claim:

1. In a multi-compressor refrigeration system wherein the compressors are lubricated by oil supplied to the crankcases thereof and the oil is reclaimed for reuse in the system, a common lubricant sump for receiving all of the reclaimed oil, supply lines connecting said common lubricant sump with each of the compressors, pump means operable independently of conditions existing in the refrigeration system for constantly pressurizing said supply lines with oil from said common sump, and a float actuated solenoid valve in the supply line for each compressor controlled by the amount of oil in the crankcase of each said compressor for controlling flow of oil through said supply lines to each compressor independently of the others employed in the system and in amounts dependent upon conditions prevailing in each said compressor.

2. In a multi-compressor refrigeration system wherein the compressors are lubricated by oil supplied to the crankcases thereof and the oil is reclaimed for reuse in the system, a common lubricant sump for receiving all of the reclaimed oil, supply lines connectoing said common lubricant sump with each of the compressors, pump means operable independently of conditions existing in the refrigeration system for constantly pressurizing said supply lines with oil from said common sump, and means for controlling flow of oil through said supply lines to each compressor independently of the others employed in the system and in amounts dependent upon conditions prevailing in each said compressor, said common sump being connected with the low pressure inlets of the compressors by means of pressure equalization lines.

3. A multi-compressor refrigeration system according to claim 2, wherein the compressors comprise first and second stages, and the pressure equalization lines are connected between the common sump and the low pressure inlets of the first and second stage compressors respectively.

4. A multi-compressor refrigeration system according to claim 3, wherein the pressure equalization lines each include valves responsive to the pressure conditions existing in the first and second stage compressors respectively.

5. A multi-compressor refrigeration system according to claim 1, wherein the common sump is connected with the low pressure inlets of the compressors by means of pressure equalization lines.

6. A multi-compressor refrigeration system according to claim 5, wherein the compressors comprise first and second stages, and the pressure equalization lines are connected between the common sump and the low pressure inlets of the first and second stage compressors respectively.

7. A multi-compressor refrigeration system according to claim 6, wherein the pressure equalization lines each include valves responsive to the pressure conditions existing in the first and second stage compressors respectively.

8. A multi-compressor refrigeration system according to claim 1, wherein the reclaimed oil is returned to the common sump in accordance with the temperature conditions prevailing in said common sump.

References Cited

UNITED STATES PATENTS

| 2,076,332 | 4/1937 | Zercher | 62—468 XR |
| 2,140,415 | 12/1938 | Buehler. | |
| 2,159,815 | 5/1939 | McCune | 184—103 XR |
| 2,246,244 | 6/1941 | Consley | 184—103 XR |
| 2,274,774 | 3/1942 | Chambers | 62—468 XR |
| 2,336,671 | 12/1943 | Chambers | 62—468 XR |

FRED C. MATTERN, Jr., Primary Examiner

MANUEL A. ANTONAKAS, Assistant Examiner

U.S. Cl. X.R.

62—193, 468